United States Patent [19]

Laurent et al.

[11] Patent Number: 4,797,377

[45] Date of Patent: Jan. 10, 1989

[54] MASSIVE CRYSTALLINE ALUMINOSILICATE WITH EXPANDED STRUCTURE AND PROCESS FOR ITS MANUFACTURE

[75] Inventors: Yves Laurent, Cesson Sevigne; Patrick Verdier; Jean Guyader, both of Acigne, all of France

[73] Assignee: Centre National de la Recherche Scientifique (CNRS), Paris, France

[21] Appl. No.: 144,593

[22] Filed: Jan. 7, 1988

Related U.S. Application Data

[63] Continuation of Ser. No. 838,914, Mar. 12, 1986, abandoned.

[30] Foreign Application Priority Data

Mar. 13, 1985 [FR] France ............................. 85 03694

[51] Int. Cl.$^4$ ............................................. C03C 11/00
[52] U.S. Cl. ........................................ 501/39; 501/56; 501/85; 423/412; 264/43; 65/22
[58] Field of Search .................... 501/39, 56, 85, 155; 65/22; 264/43; 423/412

[56] References Cited

U.S. PATENT DOCUMENTS

| | | | |
|---|---|---|---|
| 2,837,873 | 6/1958 | Lynsavage | 264/43 |
| 4,186,021 | 1/1980 | Chyung et al. | 501/56 |
| 4,591,537 | 5/1986 | Aldinger et al. | 501/96 |

FOREIGN PATENT DOCUMENTS 141515  5/1980  German Democratic Rep. ... 501/39

OTHER PUBLICATIONS

Taylor K. M. et al. "Some Properties of Aluminum Nitride" J. of Electrochem Soc. Apr. 1960 pp. 308-314.

*Primary Examiner*—Mark L. Bell
*Assistant Examiner*—James M. Hunter, Jr.
*Attorney, Agent, or Firm*—Blakely, Sokoloff, Taylor & Zafman

[57] ABSTRACT

The present invention relates to a novel crystalline massive aluminosilicate with an expanded structure and to its process of manufacture. The particular structure is a closed cell structure containing nitrogen. It is obtained by: grinding industrial glass; adding aluminum based nitride in the proportion of 0.1 to 20% by weight with respect to the weight of the ground industrial glass; mixing the ground glass and so-added nitride; oxidizing the nitride within said mixture by heating to a temperature of 800° to 1000° C. for about 1 hour, and cooling and recovering the expanded crystalline aluminosilicate. The material has multiple applications in the building industry and in the construction of furnaces, in the manufacture of fireproof walls and doors, and in naval construction, with various advantages over prior art materials.

6 Claims, No Drawings

MASSIVE CRYSTALLINE ALUMINOSILICATE WITH EXPANDED STRUCTURE AND PROCESS FOR ITS MANUFACTURE

This is a continuation of application Ser. No. 838,914, filed Mar. 12, 1986, now abandoned.

BACKGROUND OF THE INVENTION

The present invention relates to a massive aluminosilicate at least partly crystalline having an expanded closed cellular structure containing nitrogen, as well as the process for its manufacture.

An object of the present invention was to provide a novel expanded massive material having a good coefficient of thermal insulation, whilst possessing good compressive strength rendering it usable as a bearer material. Such a material finds multiple applications, both in the traditional field of building and in the thermal insulation of furnaces, in the manufacture of fireproof walls and doors, as well as in naval construction. "Massive" is used in the sense "monolithic", as opposed to "particulate".

It was also an essential object to be able to produce such a type of material which is light, impermeable to water, noninflammable and resistant to relatively high temperatures of the order of 1000° C. In addition, it is highly desirable that such a material should be manufacturable continuously.

In the present state of the art, it is known to manufacture expanded glass foam materials by employing a technique of expanding reclaimed glass by means of carbonate which causes, by raising the temperature, a release of carbon dioxide. In practice, such a material does not however give entire satisfaction, particularly for the following reasons. Such a glass foam has a high sensitivity to moisture which may be attributed to the nature itself of the expansion agent used. In fact, the carbonates used allow the subsistence in the material of a metal oxide residue which is hydrolyzed in situ to give rise to basic lyes which are detrimental to the quality and the longevity of the product. The use of such a product therefore obligatorily necessitates an additional protection by means of a coating of a quality designed to ensure its impermeabilization.

In addition, such a glass foam can only be manufactured batchwise. Finally, its method of production necessitates a very long annealing time of the order of 17 hours, which of course has a very unfavorable influence on the production costs of such a product.

U.S. Pat. No. 2,837,873 has besides proposed a method of manufacturing a stratified vitreous material, having the form of a succession of layers of different cellular structures. The core of the material, of low density, which is intended to confer good thermal insulation, must however necessarily be jacketed by a denser layer if it is desired to obtain a product endowed with acceptable mechanical properties. The difference in cell structure of the successive layers results from a modification of the nature of the foaming agent used, the latter remaining in all the examples, still based on calcium carbonate. Such a product has also a high sensitivity to moisture, as mentioned previously. In addition, the compromise solution proposed by this U.S. Pat. No. 2,837,873 leads to a material whose properties, both insulating and mechanical, remain insufficient.

GENERAL DESCRIPTION OF THE INVENTION

The present invention relates, on the other hand, to a massive aluminosilicate at least partly crystalline having an expanded structure with closed cells containing nitrogen. This type of material results from the oxidation of nitride based on aluminum, leading to an expanded massive product with closed cells containing nitrogen, and said oxidation can be facilitated by the addition of catalysts, in particular of oxides whether metallic or not. This particular structure of the material renders it impermeable. In addition, this material has a total chemical inertness as well as excellent fireproofing properties.

In accordance with the process of the present invention, the material is obtained by carrying out the following successive operations:
  grinding of industrial glass;
  addition of nitride based on aluminum in the proportion of 0.1 to 20% by weight with respect to the weight of the ground industrial glass;
  mixing of the ground glass material and the thus added nitride;
  oxidation of the nitride within said mixture by heating to a temperature of 800° to 1000° C., for about 1 hour, and
  cooling and recovery of the expanded crystalline aluminosilicate.

Other features and advantages of the product and of the process according to the present invention will appear from reading the detailed description given below especially with reference to a particular embodiment of practicing the manufacturing process, given of course, purely by way of nonlimiting example.

DESCRIPTION OF A PREFERRED EMBODIMENT

The aluminosilicate according to the present invention, can for example, be obtained in the following manner. First of all there is carried out a grinding of an industrial glass, that is to say of a reclaim glass, for example, bottle glass or window glass. Such grinding is advantageously done in a ball mill or grinder; the grinding is continued until a powder is obtained. It is found in practice that the particular granulometry of such ground material is not critical.

To this ground material is then added 0.1 to 20% by weight of an aluminum-based nitride and then follows the homogenization of the mixture so obtained.

The nitride used may, for example, be constituted by aluminum nitride, either commercial aluminum nitride, or aluminum nitride having a higher reactivity, for example obtained by direct reaction of alumina and ammonia at a temperature at least about 1200° C. As a modification, the nitride used may also be constituted by the product of the reaction of an aluminosilicate, such as natural kaolin, with ammonia. The manufacture of such a nitrogen-treated aluminosilicate can advantageously be done by heating the aluminosilicate under a flow of ammonia at a temperature of the order of 1200° C. for some hours. The kaolin, of which it is not necessary to use the best quality, is thus valorized. The oxidation of the aluminum based nitride may be conducted in the presence of a catalyst, such as an oxide.

The mixture thus obtained of the ground glass and aluminum based nitride is then placed in a furnace, for example, a muffle furnace whose rise in temperature from 20° C. up to 900° C. is carried out in about 1 h 30.

This temperature, close to the glass transition temperature, is then maintained for about 1 hour, then the furnace is allowed to cool. On account of the thermal inertia of the furnace, a temperature of the order of 400° C. is obtained at the end of about 2 hours, at which temperature it is possible to remove the expanded crystalline alumunosilicate. The material obtained is then in the form of a grey-whitish colored product, of volume very much greater than that of the starting material.

It should be noted that the previously indicated temperatures, as well as the cycles of rise and fall in temperature, may be subjected to a certain number of adaptations and modifications.

It should be noted that such an operational method enables continuous practicing of the process according to the invention, the oxidation of the aluminum-based nitride being, for example, effected by passage through a tunnel furnace.

The partly crystalline aluminosilicate has all the desired properties.

The material according to the invention has an apparent density comprised between 200 and 700 kg/m$^3$. The exact value of the density obtained is a function of the nature of the starting glasses used, as well as of the nature and quality and amount of aluminum based nitride which has been added thereto. This aluminosilicate is hence a lighter material than all of the traditional cellular materials.

Due to the fact of its expanded structure with closed cells containing nitrogen, the massive aluminosilicate according to the invention constitutes a material completely impermeable to water and having an excellent resistance with respect to the action of chemical agents. It fully withstands, in fact, concentrated hydrochloric acid, concentrated nitric acid as well as concentrated soda. After contact of the aluminosilicate according to the invention for 6 hours with these chemical agents, at ambient temperature, not the least modification of structure of the material is detected. In addition, the aluminosilicate according to the invention is insensitive to organic solvents such as ethyl alcohol, benzene, acetone, ether, etc.

The product according to the invention has also excellent resistance to high temperatures which can reach of the order of 1000° C. This product, heated for several hours at a temperature of 1040° C., does not undergo any degradation. It is, in addition, totally insensitive to thermal shock. In fact, fatigue tests of the material subjected to annealings between +400° C. and +20° C. on the one hand, and between +20° C. and −196° C. (temperature of liquid nitrogen) on the other hand have not revealed any deterioration, nor even the presence of simple fissures testifying to the existence of considerable internal stresses. The thermal expansion coefficient of this material, measured between 20° and 500° C., is equal to about $7.4 \times 10^{-6}$°K.$^{-1}$.

Various tests of compression strength, have demonstrated that the aluminosilicate according to the invention had a compression strength higher than about $3.10^6$ Pa. Such a property therefore confers on the material according to the invention, an excellent supporting character.

Various experiments conducted on the aluminosilicate according to the present invention, have revealed that the latter had a thermal insulation coefficient of the order of 0.07 W/m° C. Consequently it constitutes an excellent insulating material.

Finally, the thermal diffusivity of various samples of aluminosilicates according to the invention has been determined by the flash method, as indicated below.

Principle of the Method

The flash method used consists of irradiating uniformly for a very short time, with a pulse light source, one of the faces of a generally cylindrical specimen of small thickness and analyzing the change, as a function of time and of temperature, of the face opposite the thermal flux. The irradiated face is previously blackened to absorb the major part of the incident energy and, in the case of specimens transparent to the wavelength used, to avoid any transmission of the optical flux into the midst of the material. The thermal diffusivity is determined by analysis of the curve T(t) obtained from various theoretical models taking into account the space time distribution of the energy pulse as well as the axial thermal losses.

Description of the Measuring Device

The apparatus employed enables measurements between 20° C. and 1000° C. to be carried out. The pulse type thermal source is constituted by a glass-/neodymium laser ($=1.06$ μm) functioning in relaxed mode and delivering a beam of 23 mm diameter. The heating vessel comprises principally a cylindrical tube of inconel 600, 1.12 m long and 88 mm external diameter, around which are wound 5 heating coils distributed in the vicinity of the central zone of the furnace, rendered isothermal over about 120 mm. This chamber is provided with a cooling system by a flow of water positioned at the two ends as at the periphery and thermally insulated by several layers of refractory wool.

The control of the temperatures inside the chamber is ensured by 8 thermocouples of chromel-alumel sheathed with inconel positioned on the outer surface of the heating tube. The chamber may be finally, placed under vacuum by means of a primary pump of 4.5 m/h and a secondary pump delivering 200 1/s.

The test specimen is fixed by means of three alumina rods at the core of a stainless steel ring resting on a cradle fast to a probe constituted by a removable tube of inconel 600 of 800 mm length. The uniformity of temperature in the zone wherein the specimen is fixed is checked by means of three thermocouples of chromel-/alumel covered with an inconel sheath situated at the level of the specimen and at 60 mm on each side of the latter.

The rise in temperature is recorded by a thermocouple of chromel and alumel wire of diameter 0.2 mm positioned at the centre of the surface of the specimen opposite the thermal flow and mounted in opposition with a thermocouple of the same nature fixed in the atmosphere of the furnace in the immediate vicinity of the specimen. The signal obtained is amplified, memorized by means of a storage oscilloscope, then photographed and analysed.

Interpretation of the Signal

The fundamental parameter enabling the determination of the thermal diffusivity of the material analysed is the time taken by the signal to reach one half of its maximum value. By assimilating the specimen to a semi-infinite wall absorbing on its front surface an instantaneous energy pulse and by considering the elemental adiabatic model, the resolution of the equation of the heat leads to the relationship:

$$\alpha = 0.139\, l^2/\tau_{\frac{1}{2}}$$

where $\alpha$ represents the thermal diffusivity, $l$ the thickness of the specimen and $\tau_{\frac{1}{2}}$ half-rise time of the thermal signal. Theoretical models enable, in addition, the taking into consideration of the finite duration of the laser pulse, in the same way as the axial thermal losses.

Presentation of the Specimens

The measurements of thermal diffusivity were carried out at ambient temperature on six specimens of different thicknesses. The irradiation and detection surfaces were covered, by gluing, with a thin aluminum layer. The surface of the specimens exposed to the laser radiation was, also, covered with a colloidal graphite film polymerizing in air and absorbing almost the whole of the energy emitted in the laser pulse.

Experimental Results

The experimental results relating to the various specimens studied are collected in Table 1 below. The accuracy of these results is conditioned, on the one hand, by the uncertainties (evaluated to ±4%) on a measurement of the parameters contained in the relationship derived from the adiabatic model (thickness of the specimen, half rise time of the signal $\tau_{\frac{1}{2}}$) and, on the other hand, by the errors connected with the difference between the actual experimental conditions and the conditions at the limits postulated in the theoretical models applied, among which is uncertainty connected with the quality of gluing of the aluminum films to the surfaces of the specimens.

TABLE 1

| thickness of the specimen in mm | loss co-efficient ($\rho$) | $\frac{1}{2}$ rise time (s) | apparent diffusivity ($\times 10^{-3}$) cm$^2$/s | real diffusivity ($\times 10^{-3}$) cm$^2$/s | average values ($\times 10^{-3}$) cm$^2$/s |
|---|---|---|---|---|---|
| 3.36 | 1.10 | 3.84 | 4.08 | 3.30 | 3.37 ± 0.05 |
|  |  | 3.75 | 4.18 | 3.38 |  |
|  |  | 3.73 | 4.20 | 3.40 |  |
|  |  | 3.73 | 4.20 | 3.40 |  |
| 2.50 | 1.05 | 2.86 | 3.03 | 2.43 | 2.43 ± 0.01 |
|  |  | 2.85 | 3.04 | 2.43 |  |
|  |  | 2.84 | 3.05 | 2.44 |  |
| 3.37 | 1.05 | 3.22 | 4.90 | 3.92 | 3.88 ± 0.06 |
|  |  | 3.22 | 4.90 | 3.92 |  |
|  |  | 3.33 | 4.73 | 3.79 |  |
|  |  | 3.24 | 4.86 | 3.89 |  |
| 3.60 | 1.22 | 3.49 | 5.15 | 4.29 | 4.36 ± 0.05 |
|  |  | 3.42 | 5.26 | 4.37 |  |
|  |  | 3.42 | 5.26 | 4.37 |  |
|  |  | 3.39 | 5.31 | 4.41 |  |
| 2.50 | 1.12 | 2.26 | 3.84 | 3.12 | 3.11 ± 0.08 |
|  |  | 2.26 | 3.84 | 3.12 |  |
|  |  | 2.35 | 3.69 | 3.00 |  |
|  |  | 2.22 | 3.91 | 3.18 |  |
| 2.99 | 1.25 | 2.88 | 4.31 | 3.61 | 3.58 ± 0.10 |
|  |  | 2.88 | 4.31 | 3.61 |  |
|  |  | 3.02 | 4.11 | 3.44 |  |
|  |  | 2.84 | 4.37 | 3.66 |  |

We claim:
1. A massive partially crystalline aluminosilicate material comprising a plurality of expanded closed cell structures containing nitrogen gas.
2. A massive aluminosilicate according to claim 1, the apparent density whereof is comprised between 200 and 700 kg/m$^3$.
3. A massive aluminosilicate according to claim 1 whose coefficient of thermal insulation $\gamma$ is approximately 0.07 W/m C.
4. A massive aluminosilicate according to claim 1, whose thermal diffusivity is approximately $3 \times 10^{-3}$ cm$^2$/S.
5. A massive aluminosilicate according to claim 1, whose compressive strength is higher than about $3 \times 10^6$ Pa.
6. A massive aluminosilicate according to claim 1, whose coefficient of thermal expansion measured between 20° and 500° C. is equal to about $7.4 \times 10^{-6} K.^{-1}$.

* * * * *